US009298568B2

(12) United States Patent
Cabezas et al.

(10) Patent No.: US 9,298,568 B2
(45) Date of Patent: Mar. 29, 2016

(54) METHOD AND APPARATUS FOR DEVICE DRIVER STATE STORAGE DURING DIAGNOSTIC PHASE

(75) Inventors: Rafael G. Cabezas, Austin, TX (US);
Anh T. Dang, Austin, TX (US);
Brandon D. Nelson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2548 days.

(21) Appl. No.: 12/027,363

(22) Filed: Feb. 7, 2008

(65) Prior Publication Data

US 2009/0276793 A1    Nov. 5, 2009

(51) Int. Cl.
*G06F 3/00*     (2006.01)
*G06F 13/00*    (2006.01)
*G06F 11/00*    (2006.01)
*G06F 11/22*    (2006.01)

(52) U.S. Cl.
CPC .................................. *G06F 11/2221* (2013.01)

(58) Field of Classification Search
None
See application file for complete search history.

(56) References Cited

U.S. PATENT DOCUMENTS

| 6,886,111 | B1 * | 4/2005  | Tran ..................... G06F 11/3696 714/38.13 |
| 6,892,321 | B2   | 5/2005  | Chen |
| 6,971,048 | B1 * | 11/2005 | Hanson ............... G06F 11/3672 714/25 |
| 7,036,129 | B1   | 4/2006  | Korhonen |
| 7,039,738 | B2   | 5/2006  | Plummer et al. |
| 7,219,258 | B2   | 5/2007  | LeVangia et al. |
| 2004/0230861 | A1 | 11/2004 | Bailey et al. |
| 2005/0210329 | A1 | 9/2005 | Goss et al. |

OTHER PUBLICATIONS

Understanding the Diagnostic Subsystem for AIX; AIX 5L Version 5.3; Third Edition; Jul. 2006; excerpted 87 pages.*
IBM Redbooks, pSeries—Enhanced Error Handling for PCI Adapters (EEH), May 7, 2003, U.S., 4 pages.

* cited by examiner

*Primary Examiner* — Charles E Anya
*Assistant Examiner* — Kimberly Jordan
(74) *Attorney, Agent, or Firm* — Damion Josephs; Robert C. Rolnik

(57) ABSTRACT

The present invention provides a computer implemented method, data processing system and computer program product for running a diagnostic test on an I/O adapter. The data processing system communicates a stop command to a functional device driver; wherein the functional device driver is configured to communicate with the I/O adapter. The data processing system determines whether the functional device driver has completed storing a state of the I/O adapter. The data processing system loads a diagnostic device driver for communicating with the I/O adapter. The data processing system applies test inputs to the diagnostic device driver, wherein at least one test input is presented to the I/O adapter. The data processing system receives test results from the diagnostic device driver.

14 Claims, 3 Drawing Sheets

US 9,298,568 B2

METHOD AND APPARATUS FOR DEVICE DRIVER STATE STORAGE DURING DIAGNOSTIC PHASE

BACKGROUND OF THE INVENTION

1. Field of the Invention

The present invention relates generally to a computer implemented method, data processing system, and computer program product for testing adapters to data processing systems. More specifically, the present invention relates to protect a device driver state during diagnostic testing.

2. Description of the Related Art

Modern uses of computer systems are constructed from modular components that may be attached by slots or other connectors to a planar or motherboard. Accordingly, such systems accomplish a division of labor where core processes may be carried out by the planar and peripheral processes are carried out by devices or adapters that are modularly attached.

Some adapters can perform critical, though peripheral functions. For example, fiber optic interfaces can handle large volumes of traffic, which can be particularly beneficial to servers. Unfortunately, such mission critical adapters can interrupt business if unavailable for even a few seconds. Consequently, some users of these adapters may wish to minimize downtime that can occur when diagnosing perceived defects in adapter operation.

Unfortunately, vendor-provided diagnostic methods can include use of specialized user interfaces to cycle an adapter from an active and infuse state through various winding-down steps to a complete halt. Though helpful in diagnosing the adapter, such steps can use critical minutes of system time that otherwise would be spent serving customers. The problem is exacerbated by two additional phases of adapter outage—the diagnose phase, and the adapter enabling or reconfiguring phase. Rather than contend with minutes of downtime, a customer will mechanically remove the adapter and hot-plug a replacement adapter, returning the first adapter to the vendor.

Frequently such returned adapters are found to operate correctly and without any hardware fault. Instead, such adapters can be found to have a variety of other faults that may be correctable without downtime at the customer site. The costs of receiving a functional adapter incorrectly identified as faulty can be high.

Data processing system manufacturers build their product to be modular. That is, a data processing system has physical connectors, slots and other connecting points on a host device, A host device can be, for example, a planar, a bus, or any other system or subsystem of a data processing system. Because host devices may be manufactured by a number of vendors, and each may support a number of operating systems, a device driver is needed to account for idiosyncrasies of the host device, the adapter, or both.

Adapters can be in a number of states. One such state is "in-service," where the adapter is configured to handle data exchanges between the host system and the adapter in support of an application. An application can be a database, a website server, a video game, among many others known in the art.

Thus, a need exists to provide detection of non-hardware faults in an adapter without risking substantial downtime while locating the fault.

SUMMARY OF THE INVENTION

The present invention provides a computer implemented method, data processing system and computer program product for running a diagnostic test on an I/O adapter. The data processing system communicates a stop command to a functional device driver; wherein the functional device driver is configured to communicate with the I/O adapter. The data processing system determines whether the functional device driver has completed storing a state of the I/O adapter. The data processing system loads a diagnostic device driver for communicating with the I/O adapter. The data processing system applies test inputs to the diagnostic device driver, wherein at least one test input is presented to the I/O adapter. The data processing system receives test results from the diagnostic device driver.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
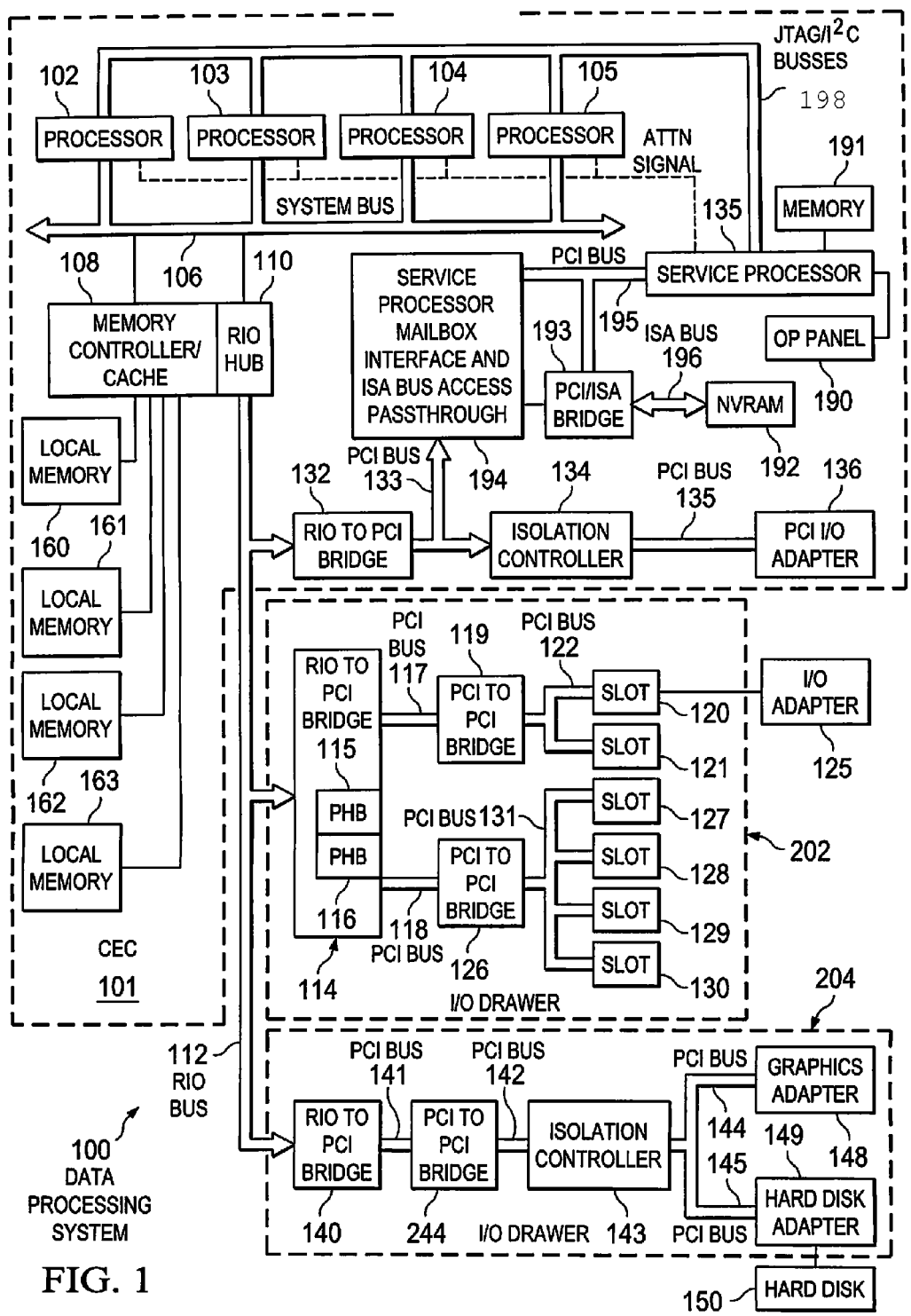
FIG. 1 is a block diagram of a multi-processor data processing system that is configured to command an I/O adapter to stop in accordance with an illustrative embodiment of the invention.

FIG. 1 is a block diagram of a multi-processor data processing system that is configured to command an I/O adapter to stop in accordance with an illustrative embodiment of the invention. A computer is coupled to a hardware management computer system, which is separate from the computer. The computer's power subsystem may include a power supply controller that is coupled to one or more power supplies. Each power supply can be located in an I/O drawer. The power supply includes a processor and a Joint Test Action Group (JTAG) engine. The JTAG engine is coupled to integrated circuits that are part of the I/O subsystem. For example, the JTAG engine is coupled to each isolation controller chip and each PCI to PCI bridge in the I/O drawer using a JTAG/I²C bus. A bridge is a device or circuit that forwards traffic between network segments.

When an error occurs in the I/O drawer, may isolate the applicable I/O adapter through the use of an I/O control system call (IOCTL) that commands the I/O adapter to halt in coordination with a device driver. In addition, the data processing system may optionally isolate the I/O adapter through an isolation controller chip.

The routing and control and isolation of slots (I/O adapters) is further explained in U.S. Pat. No. 7,219,258, which is herein incorporated by reference.

Data processing system 100 may be a symmetric multiprocessor (SMP) system including a plurality of processors 102, 103, 104, and 105 connected to system bus 106. For example, data processing system 100 may be an IBM RS/6000, a product of International Business Machines Corporation in Armonk, N.Y. Data processing system 100 includes a central electronic complex (CEC) 101, which includes logically partitioned hardware. CEC 101 includes a plurality of processors 102, 103, 104, and 105 connected to system bus 106. Alternatively, a single processor system may be employed. Also connected to system bus 106 is memory controller/cache 108, which provides an interface to a plurality of local memories 160-163. RIO Hub 110 is connected to system bus 106 and provides an interface RIO bus 112. Memory controller/cache 108 and RIO Hub 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI slots may be coupled to PCI to I/O adapters. PCI slots include slots 120, 121, and 127-130. I/O adapters include, for example, graphics adapter 148, and hard disk adapter 149. Each I/O adapter may be assigned to different logical partitions. In this case, graphics adapter 148 provides a connection for a display device (not shown), while hard disk adapter 149 provides a connection to control hard disk 150.

Thus, for example, data processing system 100 can be divided into three logical partitions, P1, P2, and P3. Each of slots 120, 121, and 127-130, graphics adapter 148, hard disk adapter 149, each of host processors 102-105, and each of local memories 160-163 is assigned to one of the three partitions.

Two I/O drawers 202 and 204 are depicted. Those skilled in the art will recognize that data processing system 100 may include any number of I/O drawers.

I/O drawer 202 includes RIO to PCI bridge 114 and the devices coupled RIO to PCI bridge 114 as described below. I/O drawer 204 includes RIO to PCI bridge 140 and the devices coupled RIO to PCI bridge 140 as described below.

RIO to PCI bridge 114 is connected to RIO bus 112 and provides an interface to PCI bus 117 and PCI bus 118. RIO to PCI bridge 114 includes one or more PCI host bridges (PHB), such as PHB 115 and PHB 116. Each PHB is coupled to a PCI to PCI bridge through a PCI bus. For example, PHB 115 is coupled to PCI to PCI bridge 119 through PCI bus 117. PHB 116 is coupled to PCI to PCI bridge 126 through PCI bus 118. Each PCI to PCI bridge is coupled to one or more PCI slots. For example, PCI to PCI bridge 119 is coupled to slot 120 and slot 121 using PCI bus 122. Although only two slots are shown, typically either four or eight slots are supported by each PHB. PCI to PCI bridge 126 is coupled to slots 127-130 using PCI bus 131.

An I/O adapter is a hardware device that converts the physical signals arriving on a cable, conduit or, or air interface to logical signals used by a system planar or connectors of the system planar. The I/O adapter operates under the control of an operating system call, mediated by a device driver. I/O adapter 125 can be, for example, a fibre channel host bus adapter. A fibre channel host bus adapter is any device configured to communicate using a fibre channel protocol standards promulgated by the Institute for Electrical and Electronics Engineers.

Memory mapped graphics adapter 148 may be connected by RIO bus 112 through PCI bus 144, isolation controller 143, PCI bus 142, PCI to PCI bridge 244, PCI bus 141, and RIO to PCI bridge 140. Hard disk 150 may be coupled to hard disk adapter 149, which is connected to PCI bus 145. In turn, this bus is connected to isolation controller 143, which is connected to RIO to PCI Bridge 140 by PCI bus 142, PCI to PCI bridge 244, and PCI bus 141.

Each slot may include an isolation controller chip to which a PCI to I/O adapter may be attached. For example, some signals routed over the RIO to PCI bridge 132 may pass across an isolation controller. RIO to PCI bridge 132 provides an interface for PCI bus 133 to connect to RIO bus 112. PCI to I/O adapter 136 is connected to isolation controller 134 by PCI bus 135. Isolation controller 134 is connected to PCI bus 133. This PCI bus also connects RIO to PCI bridge 132 to the service processor mailbox interface and ISA bus access pass-through logic 194. Service processor mailbox interface and ISA bus access pass-through logic 194 forwards PCI accesses destined to the PCI to ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 102-105 via a plurality of JTAG/I$^2$C busses 198. JTAG/ I$^2$C busses 198 are a combination of JTAG/scan busses (see IEEE 1149.1) and Phillips I2C busses. However, alternatively, JTAG/I$^2$C busses 198 may be replaced by only Phillips I$^2$C busses or only JTAG/scan busses. All SP-ATTN signals of the host processors 102, 103, 104, and 105 are connected together to an interrupt input signal of the service processor. The service processor 135 has its own local memory 191, and has access to the hardware OP-panel 190.

When data processing system 100 is initially powered up, service processor 135 uses the JTAG/scan I$^2$C busses 198 to interrogate the system (host) processors 102-105, memory controller/cache 108, and RIO Hub 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 102-105, memory controller/cache 108, and RIO Hub 110. Any error information for failures detected during the BISTs, BATs, and memory tests are gathered and reported by service processor 135.

If a meaningful or valid configuration of system resources is still possible after taking out the elements found to be faulty during the BISTs, BATs, and memory tests, then data processing system 100 is allowed to proceed to load executable code into local (host) memories 160-163. Service processor 135 then releases the host processors 102-105 for execution of the code loaded into host memory 160-163. While the host processors 102-105 are executing code from respective operating systems within the data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 102-105, local memories 160-163, and RIO Hub 110. Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Accordingly, aspects of the illustrative embodiments can minimize downtime associated with diagnosing a suspect I/O adapter. Information concerning the state of ongoing sessions on an I/O adapter may remain loaded to system memory while a diagnostic driver obtains exclusive access to the I/O adapter. Tests may be performed automatically without resorting to latencies involved in human commands to unload a functional device driver, load a diagnostic device driver and the to obtain a reloaded functional device driver. Consequently, the interval of exclusive access to the diagnostic device driver is small enough to permit many, if not all, sessions to continue without reaching time-outs. By operating within the window afforded by time-out values, the diagnostic device driver may permit an application to function without the functional device driver reporting a lost connection.

Figure 2A:
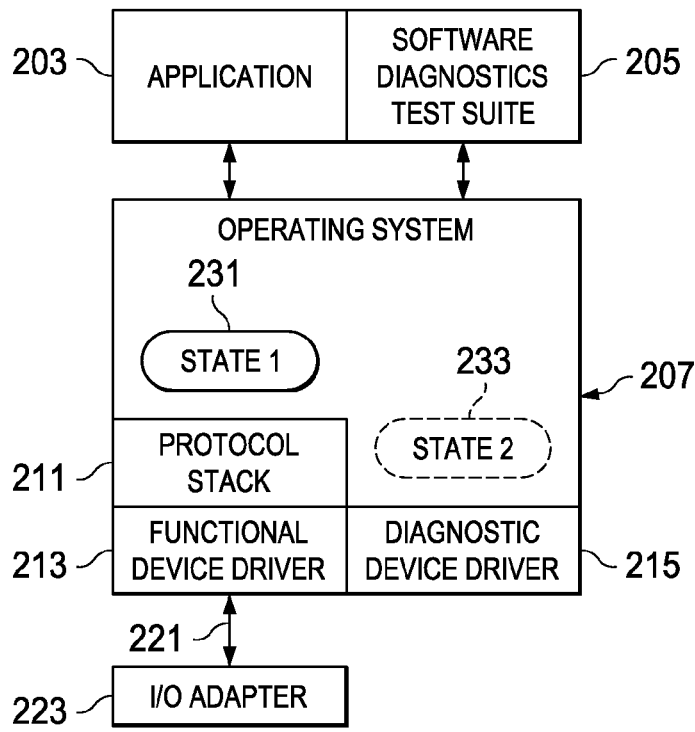
FIGS. 2A and 2B show a block diagram of components of a logical partition interacting with an I/O adapter or hardware adapter in accordance with an illustrative embodiment of the invention.

FIG. 2A shows a block diagram of components of a logical partition interacting with an I/O adapter or hardware adapter in accordance with an illustrative embodiment of the invention. The logical partition includes software components such as application 203, software diagnostics test suite 205 and operating system 207. The application and software diagnostics test suite co-exist in memory allocated to user space. The software diagnostics test suite is a function or functions that permit a user to initiate and collect diagnostic details such as test results from I/O adapters. The software diagnostics test suite may be, for example, AIX® diagnostics manufactured by International Business Machines Corp. of Armonk N.Y. AIX® is a registered trademark of International Business Machines Corporation.

The operating system provides common functionality to the application and software diagnostics test suite, including for example, memory allocation, communication and housekeeping functions. The operating system may operate in a privileged section of memory known as kernel space. The operating system may control hardware of the data processing system through the operation of system calls. Moreover, the operating system may receive function calls from application 203 and software diagnostics test suite 205 and forward such calls to a device driver that handles communication to an I/O device specified in a system call. In addition, the operating system may perform a kind of system call known as an I/O control system call (IOCTL). An I/O control system call can include a request code number, a file descriptor, and data concerning the system call. The I/O control system call is used to interact with a device driver.

Within kernel space, the operating system accesses code of protocol stack 211, which in turn delivers and receives data from functional device driver 213. A protocol stack may preprocess data to conform with presentation layer or session layer protocols, among other protocols. A functional device driver is a device driver configured to provide uniform functionality of the device to operating system calls such that the device accomplishes communication functions. For example, for a TCP/IP devices such as an Ethernet adapter, the functional device driver may receive buffers of data to be written out to a port controlled by the Ethernet adapter and may convert the buffers to packet sized payloads of binary data. As a further example, the functional device driver may convert signals of the I/O adapter to appropriately signal to the operating system the presence of data ready to be read, for example, when the adapter has collected and ordered a set of packets.

Functional device driver 213 may rely on state 1 231 as one or more places in memory that information concerning communication streams is held. A state of an I/O adapter is information that can include status and configuration information. State 1 can include, for example, PCI slot number of I/O adapter 223, status of the I/O adapter as master or slave, TCP window size, among others. When active, functional device driver may access real-time data from the I/O adapter through signals 221 on a bus.

Diagnostic device driver 215, in accordance with an illustrative embodiment of the invention, may include code resident in kernel space. A diagnostic device driver is a device driver configured to perform diagnostic routines on the device. The diagnostic device driver may operate in accordance with commands received from software diagnostics test suite 205. Test inputs may be specified at a command line or graphical user interface provided to the user by software diagnostics test suite 205. A test input is any detail of a test to be performed on an I/O adapter. Test inputs include commands, data, information concerning duration and intensity of tests to be performed, registers to load and unload, among others. Upon receiving a user command to perform tests, the software diagnostics test suite may seize control of the I/O adapter as explained further with respect to FIGS. 3A and 3B below. Diagnostic device driver 215 maintains state information in state 2 233. The state information can include, for example, an index number to a test being performed, a count of the number of iterations a test is executed, as well as protocol specific information.

Figure 2B:
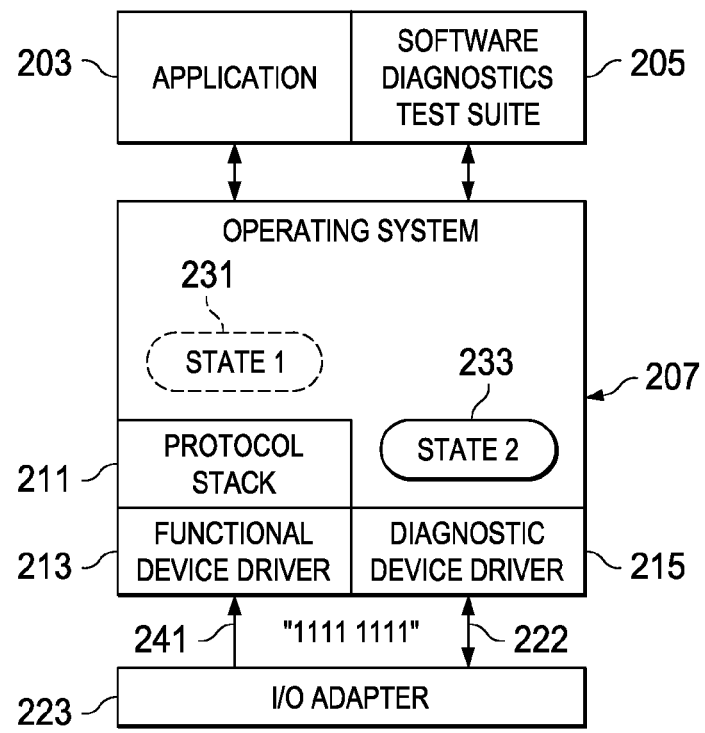

FIG. 2B shows a block diagram of components of a logical partition interacting with an I/O adapter or hardware adapter in accordance with an illustrative embodiment of the invention. FIG. 2B illustrates a diagnostic device driver 215 communicating with I/O adapter 223 using signals 222 on a bus. The bus can be, for example, PCI bus 122 of FIG. 1. During the period that diagnostic device driver 215 executes a test, the I/O adapter can respond to requests from functional device driver 213 with an all ones (1111 1111) signal 241.

Figure 3A:
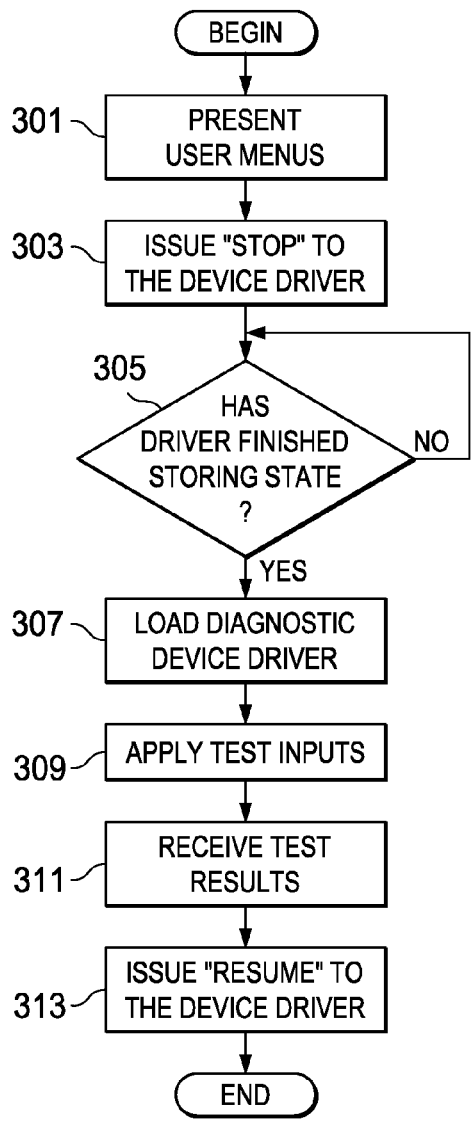
FIG. 3A is a flowchart of steps performed by a data processing system in accordance with an illustrative embodiment of the invention.

FIG. 3A is a flowchart of steps performed by a data processing system in accordance with an illustrative embodiment of the invention. A user may initially enter a command to begin an AIX® diagnostics session. The AIX® diagnostics is an example of a software diagnostics suite, and may operate as software diagnostics test suite 205 of FIG. 2B. The data processing system initially may present user menus (step 301). The user may indicate at least one test to run. Consequently, the data processing system may issue a stop command to the diagnostic device driver and/or the functional device driver (step 303). A stop command is a command sent to the I/O adapter that instructs the I/O adapter to emulate a hardware stop. The I/O adapter may emulate a hardware stop by responding to read requests with an all ones response. The stop command can be an IOCTL call issued by a software component of the data processing system, for example, a diagnostic application, a service aid, and other software components.

Next, the data processing system determines if the functional device driver has finished storing its state (step 305). The state can be, for example, state 1 231 of FIG. 2A. The state may be stored, for example, to non-volatile storage. Non-volatile storage is storage that does not lose data when power ceases. Non-volatile storage can include flash memory, disk storage, and the like. If the driver has not finished, the data processing system may re-execute step 305. Alternatively, the driver may indicate an interrupt when finished storing its state. A positive result of step 305 causes the data processing system to load the diagnostic device driver (step 307). Loading the diagnostic device driver may involve loading code of the diagnostic device driver, for example, diagnostic device driver 215 in FIG. 2B, or loading a state, for example, state 2 233 also in FIG. 2B, or both.

Next, the data processing system may apply test inputs to the I/O adapter (step 309). Test inputs can be selected based on user commands made at, for example, a user menu. The diagnostic device driver may respond with test results. A test result can be one or more output received, failure to receive an expected output, or a notation of time to receive an output response to test inputs. Such outputs are expected because of applying test inputs to a device under test. Consequently, the data processing system receives test results (step 311). Receiving test results can include the operation of Direct Memory access (DMA). DMA is a capability provided on a bus that allows data to be sent directly from an attached device, such as a disk drive, to the memory, for example, memory 160-163 of FIG. 1.

Next, the data processing system issues a resume command to the device driver (step 313). The resume command may be, for example, an IOCTL call. Processing terminates thereafter. Consequently, the functional device driver may be interrupted in its normal operation from step 307 through step 313.

Figure 3B:
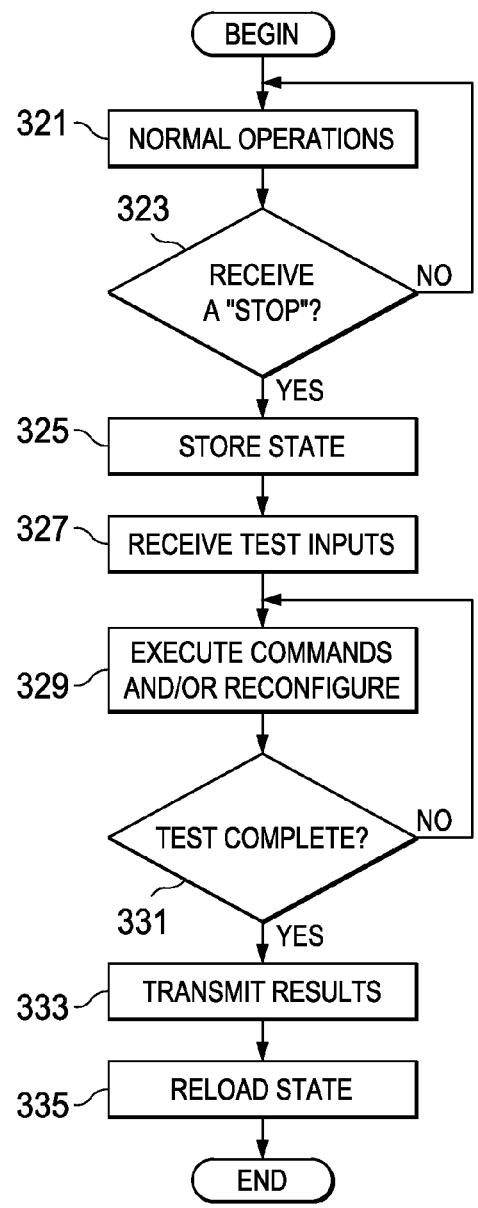
FIG. 3B is a flowchart of steps performed by a functional device driver and the diagnostics device driver in response to commands issued by the operating system in accordance with an illustrative embodiment of the invention.

FIG. 3B is a flowchart of steps performed by a functional device driver and the diagnostics device driver in response to commands issued by the operating system in accordance with an illustrative embodiment of the invention. Collectively, the functional device driver and the diagnostics device driver are called the device driver. Initially, the device driver performs normal operations (step 321). Normal operations are operations that serve a business application, such as, for example, servicing client requests for hypertext markup language (HTML) files. Next, the device driver determines if it received a stop command (step 323). While the device driver determines that no stop command is received, the device driver can re-execute step 321. The stop command may be propagated to the I/O adapter, for example, I/O adapter 223 in FIG. 2A, such that the I/O adapter emulates a hardware stop.

If the device driver receives a stop command, the device driver stores its current state (step 325). The current state is, for example, state 1 231 of FIG. 2A. Next, the device driver receives test inputs (step 327). Next, the device driver executes commands (step 329). The commands may be test inputs that reconfigure the I/O adapter. Next, the device driver determines if the testing is complete (step 331). If the testing is not complete, the device driver re-executes step 329. After completing at least one test, the device driver may transmit results to the operating system and or the AIX® diagnostic test suite (step 333). After transmitting results, the device driver may reload the state of the functional device driver (step 335). Processing terminates thereafter.

Accordingly, aspects of the illustrative embodiments can minimize downtime associated with diagnosing a suspect I/O adapter. State information concerning ongoing sessions on an I/O adapter may remain loaded to system memory while a diagnostic driver obtains exclusive access to the I/O adapter. Tests may be automatically performed without resorting to latencies involved in: human commands to unload a functional device driver; loading a diagnostic device driver; and the attendant reversed steps to obtain a reloaded functional device driver. Consequently, the interval of exclusive access is small enough to permit many if not all sessions to continue without reaching time-outs. By operating within the window afforded by time-out values, the diagnostic device driver may permit an application to function without the functional device driver reporting that a connection is lost. Furthermore, by protecting ongoing sessions, embodiments of the invention can allow for multiple episodes of testing such that a varied and thorough evaluation of the I/O adapter can be accomplished.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etch) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the alt. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for running a diagnostic test on an I/O adapter, the method comprising:
issuing an I/O control system call to a functional device driver, wherein the functional device driver is configured to communicate with the I/O adapter;
interrupting the functional device driver, based on issuing the I/O control system call;
determining whether the functional device driver has completed storing a state of the I/O adapter;
loading a diagnostic device driver for communicating with the I/O adapter, wherein state information concerning an ongoing session on the I/O adapter remains loaded to system memory while the diagnostic device driver obtains exclusive access to the I/O adapter, and the loading occurs after interrupting the functional device driver;
applying test inputs to the diagnostic device driver, wherein at least one test input is presented to the I/O adapter;
receiving test results from the diagnostic device driver; and
resuming the functional device driver, in response to receiving the test results.

2. The computer implemented method of claim 1, whereby the functional device driver remains loaded during the steps of issuing, interrupting, determining, loading, applying, and receiving.

3. The computer implemented method of claim 1, further comprising:
storing a state of the functional device driver, wherein the step of loading is responsive to storing the state of the functional device driver; and
loading the state of the functional device driver in response to receiving test results from the diagnostic device driver.

4. The computer implemented method of claim 3, wherein the step of storing comprises storing the state to non-volatile storage.

5. The computer implemented method of claim 3, wherein receiving test results comprises performing a direct memory access of memory of the diagnostic device driver.

6. A computer program product for running a diagnostic test on an I/O adapter, the computer program product comprising: a computer usable tangible storage device having computer usable program code embodied therewith, the computer program product comprising:
computer usable program code for issuing an I/O control system call to a functional device driver, wherein the functional device driver is configured to communicate with the I/O adapter;
computer usable program code for interrupting the functional device driver, based on issuing the I/O control system call;
computer usable program code for determining whether the functional device driver has completed storing a state of the I/O adapter, wherein state information concerning an ongoing session on the I/O adapter remains loaded to system memory while a diagnostic device driver obtains exclusive access to the I/O adapter, and the loading occurs after interrupting the functional device driver;
computer usable program code for loading the diagnostic device driver for communicating with the I/O adapter, wherein the state information concerning an ongoing session on the I/O adapter remains loaded to system memory while the diagnostic driver obtains exclusive access to the I/O adapter;
computer usable program code for applying test inputs to the diagnostic device driver, wherein at least one test input is presented to the I/O adapter, and the computer usable program code for applying test inputs is responsive to the functional device driver completing storing the state of the I/O adapter;
computer usable program code for receiving test results from the diagnostic device driver; and
computer usable program code for resuming the functional device driver, in response to receiving the test results.

7. The computer program product of claim 6, whereby the functional device driver remains loaded during operation of the computer usable program code for issuing, interrupting, determining, loading, applying, and receiving.

8. The computer program product of claim 6, further comprising:
computer usable program code for storing a state of the functional device driver, wherein the computer usable program code for loading is responsive to computer usable program code for storing the state of the functional device driver; and
computer usable program code for loading the state of the functional device driver in response to computer usable program code for receiving test results from the diagnostic device driver.

9. The computer program product of claim 8, wherein the step of storing comprises storing the state to non-volatile storage.

10. A data processing system comprising:
a bus;
a storage device connected to the bus, wherein computer usable code is located in the storage device;
a communication unit connected to the bus;
a processing unit connected to the bus, wherein the processing unit executes the computer usable code for running a diagnostic test on an I/O adapter, wherein the processing unit executes the computer usable program code to issue an I/O control system call to a functional device driver, wherein the functional device driver is configured to communicate with the I/O adapter; interrupt the functional device driver, based on issuing the I/O control system call; determine whether the functional device driver has completed storing a state of the I/O adapter, wherein state information concerning an ongoing session on the I/O adapter remains loaded to system memory while the diagnostic driver obtains exclusive access to the I/O adapter; load a diagnostic device driver for communicating with the I/O adapter, wherein state information concerning the ongoing session on the I/O adapter remains loaded to system memory while the diagnostic driver obtains exclusive access to the I/O adapter; apply test inputs to the diagnostic device driver, wherein at least one test input is presented to the I/O adapter; receive test results from the diagnostic device driver; and resume the functional device driver, in response to receiving the test results.

11. The data processing system of claim 10, wherein in executing computer usable code to interrupt the processing unit executes computer usable code to apply an enhanced I/O error handling event to the I/O adapter; and use a bridge to isolate the I/O adapter, wherein the functional device driver emulates a hardware stop with a cross-processes communication of an all ones response to a read request.

12. The data processing system of claim 10, whereby the functional device driver remains loaded during execution of computer usable code to issue, interrupt, determine, load, apply, and receive.

13. The data processing system of claim 10, wherein the processing unit further executes computer usable code to store a state of the functional device driver, wherein the computer usable code to load is responsive to computer usable code to store the state of the functional device driver; and load the state of the functional device driver in response to computer usable code for receiving test results from the diagnostic device driver.

14. The data processing system of claim 13, wherein in executing computer usable code to store, the processing unit executes computer usable code to store the state to non-volatile storage.

* * * * *